Patented May 26, 1931

1,807,563

UNITED STATES PATENT OFFICE

HARRY BENNETT, OF BROOKLYN, NEW YORK

PROCESS OF EMULSIFYING WATER INSOLUBLE SUBSTANCES

No Drawing.　　　Application filed March 30, 1929. Serial No. 351,452.

This invention relates to a process of emulsifying water insoluble substances with water, and an object of the invention is to prepare a permanent emulsion which is useful for depositing a thin layer of a substance upon a surface for the purpose of water proofing the surface, and cleaning or polishing the same.

The prior difficulties in this art have been in making permanent stable emulsions which would not separate. Especially has this been true in making thin emulsions such as is contemplated by the present invention. It is moreover pointed out that emulsions of the present invention are commercially valuable by reason of the thin layer deposited by eliminating waste in the excess of the layer deposited.

Bearing the foregoing in mind, another object of the invention is to provide an emulsion which is particularly adaptable for polishing and cleaning paper, textiles, leather, fibers, wood and metals, the emulsions of which, in accordance with this invention will remain stable at higher temperatures than emulsions heretofore made.

With the foregoing and other objects in view the invention consists of a novel combination and arrangement of elements treated in a manner to be particularly described and illustrated in the following description, wherein an embodiment of the invention is disclosed, but it is to be understood that changes, variations and modifications may be resorted to without departing from the spirit of the claims hereto appended.

It is within the contemplation of the invention to prepare an emulsion of water insoluble substances and water. An example of the invention wherein the process is carried out with linoleic acid is set forth for the purpose of teaching one phase of the invention.

| | |
|---|---|
| Mono-ethanolamine | 1 part (by weight) |
| Linoleic acid | 2 parts (by weight) |
| Xylidin | 22 parts (by weight) |
| Water | 10 parts (by weight) |

The mono-ethanolamine in a liquid state, is added to linoleic acid liquid or solid, depending on temperature, and heated at atmospheric pressure to about 100 degrees C., whereupon the 22 parts of xylidin liquid are added thereto during a course of stirring so as to thoroughly incorporate the ingredients in the mass. Heating is stopped when temperature reaches 100 degrees C. The 10 parts of water are then added slowly with a vigorous mixing in an emulsifier or homogenizer. The violent agitation is vigorously pursued until the mixture in the emulsifier or homogenizer has cooled to room temperature. Upon inspection of the mass at this time it will be found that a stable emulsion is produced which is of very thin consistency like milk, and which will withstand a temperature of 60 degrees C., and which has been found upon experiment to remain stable at this temperature.

Another example wherein a vegetable wax such as bees wax, in a mixture of bees wax and linoleic acid are emulsified, and for the purpose of familiarizing the art therewith, is set out as follows:

| | |
|---|---|
| Mono-ethanolamine | 1 part (by weight) |
| Linoleic acid | 2 parts (by weight) |
| Bees wax | 12 parts (by weight) |
| Xylidin | 30 parts (by weight) |
| Water | 120 parts (by weight) |

In carrying out the process in accordance with the second example, the mono-ethanolamine liquid, linoleic acid liquid or solid depending on temperature, and bees wax, solid, are heated in a container under atmospheric pressure to approximately 100 degrees C., and at this temperature the xylidin, liquid, is added with the stirring operation so as the elements will be thoroughly incorporated. The mass is then transferred to an emulsifier or homogenizer where heating is continued to keep wax molten (90-95 degrees C.) and a vigorous agitation is carried on while the 120 parts of water are slowly added to the foregoing mixture, after the water is added the heat is removed and the agitation is continued vigorously until the mixture has cooled to atmospheric or room temperature.

The following may be substituted for the mono-ethanolamine:

Di or tri-ethanolamine

Ethylene diamine.

Hydroxides of the alkaline earths or metals, ammonia, ammonium compounds, ethylamine or other alkyl or aromatic amines; sulfonic acids, salts and their derivatives.

The following may be substituted for the linoleic acid:

Hydroxystearic acid, sebacic, and other fatty acids.

Abietic, naphthenic, and similar acids.

Saponifiable fats, oils, waxes.

The following may be substituted for the xylidin:

Eugenol or other alcohols insoluble in water.

Benzyl benzoate or other esters insoluble in water.

Phenylethyl ether or other ethers insoluble in water.

Benzaldehyde or other aldehydes insoluble in water.

Terebene or other terpenes insoluble in water.

Hexane or other hydrocarbons.

In general any organic product insoluble in water and compatible with the other ingredients.

The following may be substituted for the beeswax:

Carnauba, Japan, candelilla or other vegetable waxes.

Paraffin or chlorinated paraffins or other mineral waxes.

Fats, oils or greases.

Gums, resins, varnish, chicle, and rubber latex.

Having thus described the invention, what I claim as new and desire to secure by Letters Patent is:—

1. A process of forming an aqueous emulsion comprising adding mono-ethanolamine to linoleic acid and heating the mass at atmospheric pressures; thereafter adding xylidin and agitating the mass; then slowly adding water with continued agitation until the temperature recedes to atmospheric temperature.

2. In a process of forming an aqueous emulsion comprising adding one part of mono-ethanolamine to two parts linoleic acid and heating the resulting mass at approximately 100° centigrade at atmospheric pressure; thereafter agitating the mass and adding twenty two parts xylidin to the resulting mass; adding ten parts water slowly with constant agitation and continue agitation until the temperature of the resulting mass recedes to atmospheric temperatures.

3. In a process of forming an aqueous emulsion comprising adding one part of mono-ethanolamine to two parts linoleic acid and beeswax and heating the resulting mass at approximately 100° centigrade at atmospheric pressure; thereafter agitating the mass and adding twenty two parts xylidin to the resulting mass; adding ten parts water slowly with constant agitation and continue agitation until the temperature of the resulting mass recedes to atmospheric temperatures.

4. In a process of forming an aqueous emulsion comprising adding one part of mono-ethanolamine to two parts linoleic acid and twelve parts beeswax and heating the resulting mass at approximately 100° centigrade at atmospheric pressure; thereafter agitating the mass and adding twenty two parts xylidin to the resulting mass; adding ten parts water slowly with constant agitation and continue agitation until the temperature of the resulting mass recedes to atmospheric temperatures.

In testimony whereof I affix my signature.

HARRY BENNETT.